United States Patent Office.

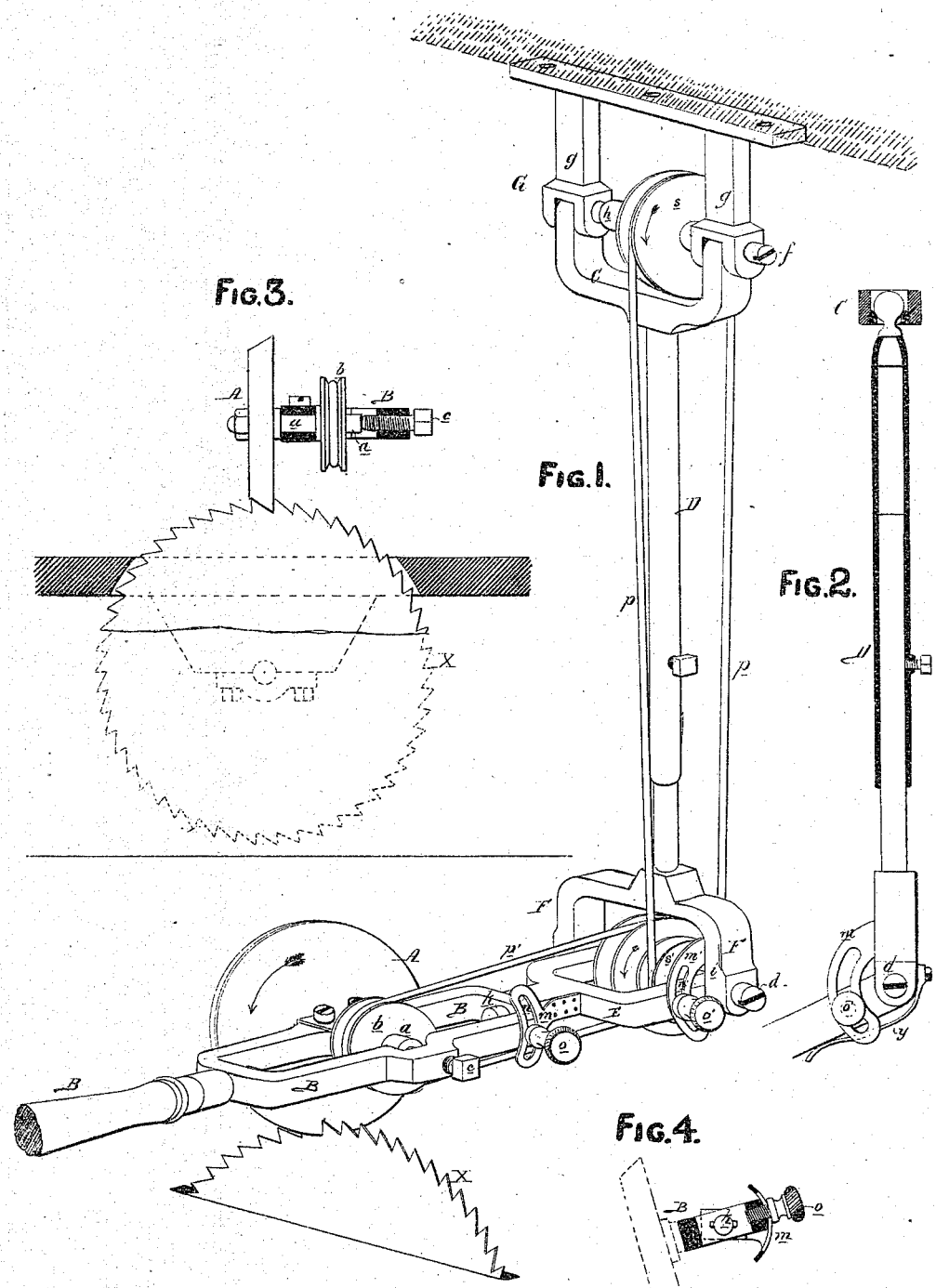

JOHN ATKINSON BORTHWICK, OF PHILADELPHIA, PENNSYLVANIA.

Letters Patent No. 105,543, dated July 19, 1870.

IMPROVEMENT IN MACHINE FOR SHARPENING SAWS.

The Schedule referred to in these Letters Patent and making part of the same.

I, JOHN ATKINSON BORTHWICK, of Philadelphia, ounty of Philadelphia, State of Pennsylvania, have nvented an Improved Machine for Sharpening Saws, &c., of which the following is a specification.

Nature and Object of the Invention.

My invention consists in the combination with a saw or other instrument, arranged on its permanent bearings, of a rotary sharpening-tool or cutter, turning on bearings on a swinging frame, by which the cutter is supported, adjacent to the said instrument, the said frame being so constructed that the cutter can be adjusted to and operated in any desired position, the necessity of removing and replacing the saw or other instrument, whenever it has to be sharpened, being thus avoided.

Description of the Accompanying Drawing.

Figure 1 is a perspective view of my improved machine, showing the same arranged for sharpening the teeth of a circular saw.

Figures 2, 3, and 4, detached views, partly in section, of parts of the machine.

General Description.

A is a grindstone or cutter, of emery, corundrum, or other material, the edge of which, in the present instance, is leveled from one side.

The cutter is secured to a spindle, $a$, which turns in a bearing at one side of a frame or holder, B, and is supported at the inner end by a center-screw, $c$, passing through the opposite side of the frame.

The frame B is provided with a handle, B', and is suspended by a swinging frame in a position adjacent to a saw or other instrument, which may, from time to time, require to be sharpened.

This swinging frame, in the present instance, is suspended from a hanger, G, secured in a fixed position above the instrument to be sharpened, center-screws $ff$, which pass through arms $g\ g$ of the hanger, affording a bearing for a shaft, $h$, and supporting a yoke, C.

An extension bar, D, consisting of a tube and a rod, adjustable in the same, and secured by a set-screw, is connected at its upper end by a universal joint to the yoke C, as shown in fig. 2, and a yoke, F, is secured to the lower end of the bar D, and is connected to a yoke, E, by center-screws $d$, the pointed ends of which serve as bearings for a shaft, $i$.

The frame B is connected to the yoke G by a pin or bolt, $k$, on which the said frame can turn freely, and to the yokes G and F are secured plates $m\ m'$, having curved slots $n\ n$, through which set-screws $o\ o'$ pass into the yoke E and frame B, as shown in figs. 1 and 4.

A rotary motion in the direction of its arrow is imparted to the shaft $h$ from any adjacent driving-shaft, and is communicated to the shafts $i$ and $a$ by belts $p$ and $p'$, which pass round grooved pulleys on the said shafts, as shown in fig. 1, a rotary motion in the direction of its arrow being thus imparted to the cutter A.

In the present instance the machine is illustrated as arranged for operating on a circular saw, $x$, the teeth of which may, from time to time, require to be sharpened. When this operation is to be performed, the machine is brought to the position shown in fig. 1. The operator grasps the handle B', and, adjusting the frame B as may be necessary, applies the cutter A to one of the saw-teeth, which is speedily reduced to the desired form; the saw is then turned so as to bring the next tooth to the proper position, and the operation is repeated.

Owing to the numerous joints in the hanging frame of the machine, the cutter may be turned to any position, and may be passed in any direction over or applied at any angle to the edge of the saw; but the movements of the cutter in one or more directions may be limited if desired; for instance, by turning the screw $o$, so as to clamp the plate $m$, after the frame B has been turned to any position on the pin $k$, fig. 4, the frame is secured in the said position, so that the cutter, when applied successively to the saw-teeth, will impart to all the same angle, while the yoke E may be secured in any position by the screw $o'$ to limit the downward movement of the cutter, and insure the cutting of the teeth to a uniform depth. While these movements of parts of the frame are limited, the entire frame may be freely swung to any position required to apply the cutter properly to the teeth of the saw.

Should the belt $p$ be too tight or too slack, or should the saw $x$ be replaced by another of a different size, the extension arm D may be lengthened or shortened, accordingly.

After the saw has been sharpened, the machine may be swung upward and secured in a position near the ceiling of the apartment, where it will not interfere with the usual operation of the saw, but will be in a position to be instantly brought into service when the saw has to be sharpened.

By the combination with a saw or other instrument, arranged on its permanent bearings, of a rotary cutter, so suspended that, without interfering with the ordinary operations of the instrument, it can be at any time applied to the same, the necessity of frequently removing and replacing the instrument to sharpen it, or of employing it in a dull condition to to avoid such removals, is obviated.

Although the machine has been shown as arranged to operate on a circular saw, it may (either constructed as described or in a modified form) be employed with other implements which require repeated sharpening or grinding.

A spring, y, secured to the yoke F, and, extending below the yoke E, will tend to hold the latter and the frame B in a horizontal position without preventing them from being depressed on the application of pressure, or a suitable counter-weight may be applied to an arm extending from the yoke E.

I do not limit myself to any special form of swinging-frame, as its construction will depend to a great extent on the character of the movements to be imparted to the cutter and the relative position of the driving-shaft and the instrument to be sharpened; and it will also be apparent that the form of the cutter will depend upon the character of the instrument to be sharpened and the form to be imparted to the cutting-edges.

I do not claim broadly a cutting or other tool, turning in bearings on an adjustable or jointed frame, so that the said tool can be applied while rotating to any desired portion of an instrument or article to be sharpened, ground, or polished; but

I claim—

The rotary cutter A, its jointed frame and driving-belts, operating substantially as described when the whole is permanently suspended above, and arranged, in respect to a circular saw or other cutting instrument, so that the cutter can be applied to the instrument without removing the latter from its permanent bearings.

In testimony whereof I have signed my name to this specification in the pesence of two subscribing witnesses.

JOHN ATKINSON BORTHWICK.

Witnesses:
FRANK B. RICHARDS,
LOUIS BOSWELL.